United States Patent [19]

Still, Jr. et al.

[11] Patent Number: 4,522,875
[45] Date of Patent: Jun. 11, 1985

[54] STAMPABLE SHEETS OF BONDED LAMINATE OF METAL SHEET AND FIBER MAT REINFORCED POLY(ARYLENE SULFIDE) AND METHOD OF PREPARATION USING RADIO FREQUENCY ENERGY

[76] Inventors: Robert D. Still, Jr.; Paul J. Boeke, both of Bartlesville, Okla.

[73] Assignee: Phillips Petroleum Company, Bartlesville, Okla.

[21] Appl. No.: 538,069

[22] Filed: Sep. 30, 1983

[51] Int. Cl.³ .................. B32B 15/00; B32B 17/00; B32B 27/06
[52] U.S. Cl. .................. 428/285; 427/45.1; 427/46; 428/286; 428/288; 428/290; 428/419
[58] Field of Search ............ 428/283, 284, 285, 286, 428/288, 290, 419; 427/45.1, 46

[56] References Cited

U.S. PATENT DOCUMENTS

| | | | |
|---|---|---|---|
| 3,527,667 | 9/1970 | Larsen et al. | 161/216 |
| 3,567,594 | 3/1971 | Wells | 204/20 |
| 3,622,376 | 11/1971 | Tieszen | 117/132 B |
| 3,894,983 | 7/1975 | Higbee | 260/37 R |
| 4,075,388 | 2/1978 | Doss | 428/297 |

FOREIGN PATENT DOCUMENTS 2065027  6/1981  United Kingdom .............. 428/419

Primary Examiner—Marion E. McCamish

[57] ABSTRACT

A method for preparing stampable composites of poly(arylene sulfide) compositions that are radio frequency energy sensitive and reinforced with fibrous or filamentous mat; the stampable composites prepared thereby; a method for preparing a laminate with metal sheet and fiber mat reinforced poly(arylene sulfide) in which the poly(arylene sulfide) is sensitive to radio frequency energy; a bonded laminate produced thereby; stamped objects produced from the composites and/or laminates.

41 Claims, 5 Drawing Figures

STAMPABLE SHEETS OF BONDED LAMINATE OF METAL SHEET AND FIBER MAT REINFORCED POLY(ARYLENE SULFIDE) AND METHOD OF PREPARATION USING RADIO FREQUENCY ENERGY

BACKGROUND OF THE INVENTION

This invention relates to poly(arylene sulfide) compositions, more particularly to poly(phenylene sulfide) compositions. In one of its aspects this invention relates to porous and non-porous reinforced compositions containing poly(arylene sulfide). In another of its aspects this invention relates to porous reinforced compositions containing poly(arylene sulfide) that have been made radio frequency sensitive. In other aspects the invention relates to methods for impregnating reinforcing mat with poly(arylene sulfide) compositions that have been made radio frequency sensitive. In other aspects of the invention it relates to preparing laminates of metal sheet and fiber or filament reinforced composites of poly(arylene sulfide) sensitized to radio frequency energy. In still further aspects the invention relates to a method of producing stamped composite or laminate structures. In still further embodiments of the invention it relates to radio frequency sensitive compositions of poly(arylene sulfide); porous and non-porous reinforced composites produced from this material; laminates made from these composites; and stampable sheets made from either the composites or the laminates.

Poly(arylene sulfide), particularly poly(phenylene sulfide), is known to be useful in the production of stampable composites that can be reinforced using fibers or filamentous materials. The present invention is concerned with methods for facilitating the preparation of a porous or non-porous, stampable composite material by using poly(arylene sulfide) that is made sensitive to radio frequency energy. Stampable, porous and non-porous sheets produced from this material have good physical characteristics are uniform in appearance and the porous sheets can be of particular use as filter material or, like the non-porous sheets, can be stamped into strong, lightweight, molded items.

It is therefore an object of this invention to provide a method for making porous, reinforced composites of radio frequency sensitized poly(arylene sulfide) reinforced with fibers or filaments. It is another object of this invention to provide methods for incorporating radio frequency sensitized poly(arylene sulfide) into a fibrous or filamentous mat. It is still another object of this invention to provide a method for bonding metal sheet to the surface of a discontinuous or continuous matrix of poly(arylene sulfide) containing fibrous or filamentous reinforcement. It is another object of this invention to provide radio frequency sensitive compositions of poly(arylene sulfide), to provide composites of radio frequency sensitive poly(arylene sulfide) compositions as a discontinuous or continuous matrix surrounding fibrous or filamentous reinforcing mat, and to provide laminates of these compositions with metal sheets. It is still another object of this invention to provide stampable sheets of bonded laminate of metal sheet and porous, or non-porous fiber mat reinforced poly(arylene sulfide), stampable sheets of laminates of porous, fiber mat reinforced poly(arylene sulfide) and stampable sheets of fibrous or filamentous reinforced, discontinuous or continuous matrices of poly(arylene sulfide).

Other aspects, objects and the various advantages of this invention will become apparent upon reading the specification and the appended claims.

STATEMENT OF THE INVENTION

According to this invention, a method is provided for preparing stampable composites of poly(arylene sulfide) compositions that are radio frequency energy sensitive and reinforced with fibrous or filamentous mat. In this method a fibrous or filamentous mat is surrounded with a discontinuous or continuous matrix of poly(arylene sulfide) that has been made sensitive to radio frequency energy.

In more particular embodiments of this invention the fiber mat is surrounded with a discontinuous matrix of poly(arylene sulfide) that has been made sensitive to radio frequency energy by (1) contacting a reinforcing mat with sensitized poly(arylene sulfide) in a slurry bath of poly(arylene sulfide) in a carrier liquid and drying the impregnated mat; (2) electrostatically coating the reinforcing mat with sensitized poly(arylene sulfide); and (3) spraying the reinforcing mat with a slurry of sensitized poly(arylene sulfide) powder in a carrier liquid.

In a further embodiment of the invention a laminate of metal sheet and fiber mat reinforced poly(arylene sulfide) is formed by contacting metal sheet with at least one surface of a porous or non-porous composite of reinforcing mat contained in a discontinuous or continuous poly(arylene sulfide) matrix that is sensitive to radio frequency energy and supplying sufficient radio frequency energy to heat the poly(arylene sulfide) matrix to bonding temperature while compressing the metal sheet against the porous reinforced matrix with sufficient pressure and for a sufficient time to form a bonded laminate. A bonded laminate which is a sheet of metal bonded to one side of a reinforced poly(arylene sulfide) matrix formed as just described can, by a process of this invention, be similarly bonded to other poly(arylene sulfide) matrices or other metal/poly(arylene sulfide) matrix-laminates.

In further embodiments of the invention, at least one, preferably a stack, of stampable poly(arylene sulfide) reinforced with fibrous or filamentous mat prepared as described above or laminates of metal sheet and reinforced poly(arylene sulfide) matrix prepared as described above are subjected to heating, preferably using radio frequency energy, to a temperature range suitable for stamping and, while the composite or laminate remains at stamping temperature, supplying sufficient pressure on the composite or laminate material within a stamping press to form a stamped object.

In still further embodiments of the invention, a stampable composite of fibrous or filamentous reinforcing mat surrounded by a matrix of poly(arylene sulfide) sensitized to radio frequency energy is provided.

In still another embodiment of the invention, a stampable laminate of metal sheet bonded to a matrix of poly(arylene sulfide) which has been made radio frequency energy sensitive and which contains fibrous or filamentous reinforcing mat is provided.

The term poly(arylene sulfide) includes homopolymers and the normally solid arylene sulfide copolymers, terpolymers and the like having melting or softening points of at least 300° F. (149° C.) and more preferably from about 400° F. (200° C.) to about 900° F. (482° C.). Other examples of poly(arylene sulfides) are poly(4,4'-biphenylene sulfide), poly(2,4-toluene sulfide) and a copolymer prepared from p-dichlorobenzene, 2,4-dichlorotoluene and sodium sulfide, and the like.

The poly(arylene sulfide) resins, often abbreviated PAS, contemplated in the compositions of this invention include those described in U.S. Pat. No. 3,354,129 issued to Edmonds, Jr. and Hill, Jr. on Nov. 21, 1967, and those described in U.S. Pat. No. 3,919,177. The presently preferred polymer is poly(phenylene sulfide), often abbreviated PPS.

As set out above and as will be demonstrated below in the examples, the present invention is based on the discovery that for use in composites reinforced with fibrous or filamentous material PAS that has been made sensitive to radio frequency energy facilitates the preparation of the composites and achieves an adequate processability and appearance when the composites are subsequently used in the preparation of laminates and stamped objects.

Poly(arylene sulfide) can be made sensitive to radio frequency energy by mixing various sensitizing compounds with PAS powder. Among useful sensitizing agents are: polar compounds such as Solprene conductive carbon blacks, and polar compounds such as a mixture of butadiene styrene copolymer, triethylnolamine, polyethylene glycol, and silica, better known as Frequon ® and similar polar compounds and compositions. Among these, Frequon, as disclosed in U.S. Pat. No. 4,360,607 by Thorsrud, is presently preferred.

These sensitizing agents are mixed with the PAS in an amount to provide the required sensitivity to radio frequency energy. The necessary amount usually will fall within a range of about 0.5 to about 10 weight percent sensitizing agent as a portion of the total composition of polymer and sensitizing agent. A range of about 2 to about 4 weight percent sensitizing agent to total composition is preferred and a range of about 3.5 to about 4 weight percent sensitizing agent to polymer is most preferred.

The reinforcing material useful in the present invention can be continuous filaments or they can be cut or chopped (staple fibers). At present, glass is the preferred reinforcing agent and it is preferably used as a continuous filament. If continuous filaments are not used, the length of the fibers will usually fall within the range of about 0.64 cm (0.25 in) to about 25.4 cm (10 in) preferably within a range of about 1.2 cm (0.5 in) to about 5.1 cm (2.0 in). Reinforcing mat made from continuous filaments can contain a binding material. Reinforcing mat that does not have continuous filaments usually will have a binder material particularly for the shorter fiber lengths. The binder is usually chosen from thermoplastic materials including PAS and thermoset plastics. Reinforcing mat that does not contain a binding material can be physically bonded by heating or needle punching or mechanically bonded by intertwining.

It is within the scope of this invention to use as reinforcing agent any of the filamentous or fibrous reinforcing agents known in the art. Among these, in addition to glass, are carbon, wholly aromatic polyamides, and certain fiber-forming inorganic materials and mixtures of the materials cited above.

Useful wholly aromatic polyamides can be chosen from those having a melting or decomposition temperature of at least 350° C. as set forth in *Encyclopedia of Polymer Science and Technology*, Vol. 10, 1969, Interscience Publishers, pp. 583–593, incorporated here by reference, particularly fibers of poly(p-phenylene terephthalamide), poly(p-phenylene isophthalamide), poly(m-phenylene isophthalamide), and the like.

Other fiber-forming inorganic materials which can be used in the reinforcing agent of this invention can be chosen from those set out in *Encyclopedia of Polymer Science and Technology*, Vol. 6, 1967, Interscience Publishers, pp. 610–668, incorporated here by reference, particularly fibers of berillia, magnesia, alumina, silica, zirconia, thoria, boron, boron nitrite, boron carbide, silicon carbide, alumino-silicate, and the like.

The metals useful in forming sheets that can be bonded to the reinforced composite of the present invention can be chosen from among any of those metals known to be useful in forming thin sheets. Among those suitable are steel alloys of iron, cobalt, nickel, chromium, tungsten, copper and its brass alloys, zinc, magnesium, aluminum and the like.

The method for producing the reinforced, stampable composite of PAS and fibrous or filamentous mat according to this invention encompasses any method by which the fiber mat material can be surrounded with a discontinuous matrix of PAS to provide a porous structure in which the fibrous or filamentous material is coated with PAS but in which the matrix of PAS is not so continuous as to be nonporous. Three of the preferred embodiments for producing the stampable, reinforced composite will be outlined below, described in conjunction with the drawing in which FIG. 1 is a schematic representation of a continuous process for impregnating continuous fibrous or filamentous mat with a slurry of radio frequency energy sensitized poly(arylene sulfide) with further processing to produce a product;

Figure 4:
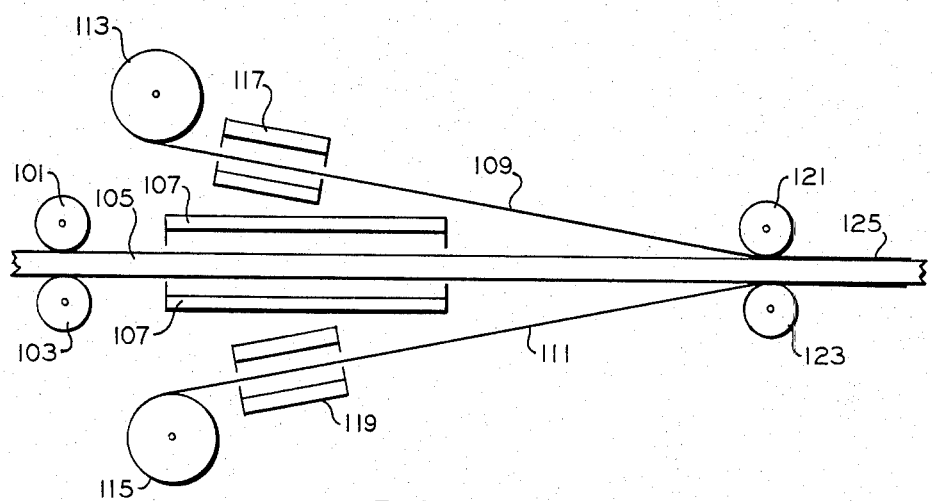
Figure 5:
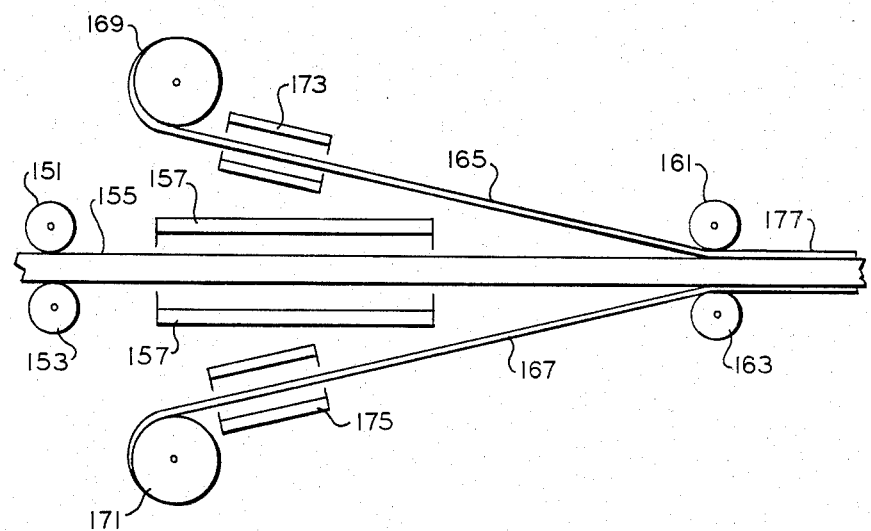

FIG. 4 is a schematic representation of a process for bonding metal sheet onto the surface of a porous, composite of fibrous or filamentous reinforcing mat and a porous matrix of poly(arylene sulfide) sensitized to radio frequency energy; and FIG. 5 is a schematic representation of the process for bonding a laminate of metal bonded to fibrous or filamentous reinforced stampable composite of PAS to a fibrous or filamentous reinforced composite of PAS.

Figure 1:
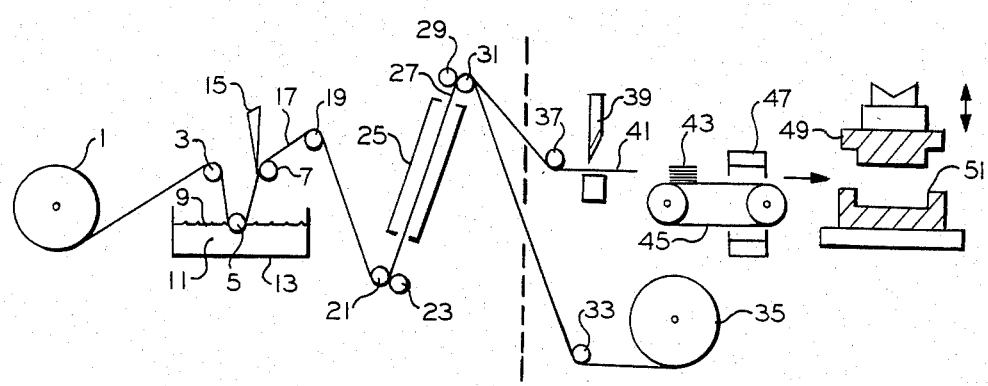

Referring now to the drawing, in FIG. 1, a method for preparing porous, reinforced, stampable PAS—fiber mat composites and stamping the stacked composites into molded objects can be described. A continuous roll (1) of fibrous or filamentous mat is fed over guide rollers (3), (5), (7) directing the mat beneath the liquid level (9) of a slurry (11) of PAS and radio frequency energy sensitizing agent slurried in a carrier liquid contained in tank (13). Excess slurry is removed by scraper (15) as the slurry impregnated continuous mat (17) exits the slurry bath. The impregnated mat (17) passes over guide roller (19) and between nip rollers (21), (23) and through radio frequency energy heater (25) in which the temperature of the PAS is raised sufficiently to cause flow over the surface of the mat components to form a porous reinforced composition of PAS in which the fiber or filament surfaces are coated with PAS. The reinforced composite (27) exits the radio frequency energy heater (25) between rollers (29), (31) which act as feed rollers to forward the mat through the system and can act by close setting of the clearance between the rollers as compression rollers to compact the porous, reinforced composite before it cools. The porous, reinforced composite can be forwarded either around guide roller (33) onto a takeup roll (35) to produce a wound product or can be forwarded around guide roller (37) through cutting station (39) to produce cut portions of porous, reinforced composite (41). These cut portions are passed individually or as stacks (43) are passed by belt (45) through a heater (47) which can be radio frequency energy or other energy source in which the temperature is raised sufficiently for the composite to be molded by stamping. The heated composite, or stacked composites (43), are then passed into a stamp press (49) which can be a hand press or preferably a hydraulic press, wherein sufficient pressure is applied while the composite is still at stamping temperature to mold the sheets into the shape of a press die (51). Stamping temperature for the composites generally will be in a range of about 288° C. (550° F.) to 343° C. (650° F.), preferably within a range of about 302° C. (576° F.) to 316° C. (600° F.). Stamping pressure will be within a range of about 1,000 psi (6.9 mpa) to 10,000 psi (69 mpa), preferably within a range of about 1,500 psi (10.3 mpa) to 6,000 psi (41.3 mpa). After being held in the die for a sufficient time to obtain molded shape, generally within a range of about 0.5 minutes to about 2 minutes the molded object can be removed.

Figure 2:
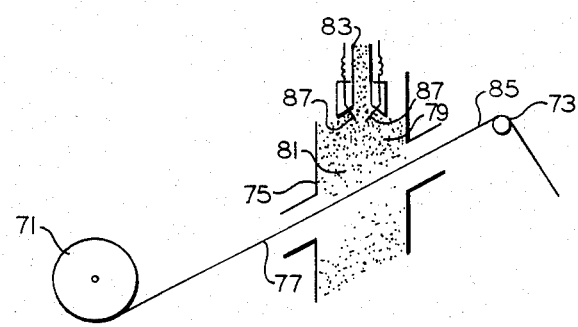
FIG. 2 is a schematic representation of electrostatic coating of fibrous or filamentous reinforcing mat with sensitized poly(arylene sulfide) powder for further treatment.
Figure 3:
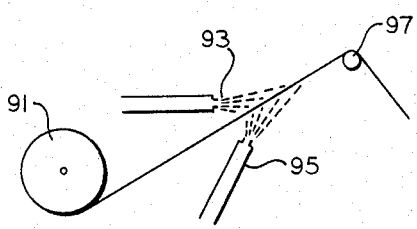
FIG. 3 is a schematic representation of impregnation of fibrous or filamentous reinforcing mat by spraying with a slurry of sensitized poly(arylene sulfide)

Alternative means for impregnating the reinforcing mat are shown in FIGS. 2 and 3. Referring now to FIG. 2 a roll of fibrous or filamentous mat (71) is unwound over a guide roll (73) so that the mat passes through a chamber (75) for imparting an electrostatically charged powder to the mat. The chamber contains an electrostatic spray gun such as a Model 720 from Gema, Sweden. The mat (77) passes through a contact chamber (79) where it is contacted with radio frequency energy sensitized poly(arylene sulfide) powder (81) from an electrostatic discharge unit (83) having electrodes (87) for imparting the electrostatic charge to the powder. The electrostatically impregnated mat (85) then passes over guide roll (73) for further treatment as set out in the discussion of FIG. 1 above by passing through nip rolls (21), (23) and through the rest of the system.

Referring now to FIG. 3 an alternative method for impregnating that mat is shown in which roller fiber mat (91) is unwound and drawn past spray nozzle or nozzles (93), (95) passing a stream of slurry of sensitized poly(arylene sulfide) powder in a carrier liquid into contact with the mat to produce a slurry impregnated mat which is then forwarded over guide roll (97) through the processing system as set out in FIG. 1 subsequent to the nip rolls (21), (23).

Referring now to FIG. 4, a process is set out in which a porous, reinforced composite such as that produced by the methods of FIGS. 1-3 is bonded with metal sheeting to form a laminate. Forwarding rolls (101), (103) move continuous porous, reinforced composite (105) which could be unrolled from a product roll such as 35 produced in FIG. 1 or could be forwarded directly from a production process such as from the forwarding rolls (29), (31) of FIG. 1, through a heating means (107), illustrated here as radio frequency energy heater, within which the composite is raised to a temperature sufficient to accomplish bonding with continuous metal strips (109), (111) supplied from feed rolls (113), (115) and passing through heaters (117), (119) wherein the temperature is raised to be compatible with the bonding temperature necessary for the reinforced composite. The heated composite (105) is passed between compression rolls (121), (123) with a heated metal strip (109), (111) on each of the two surface faces so that the metal strips are compressed against the reinforced composite with sufficient pressure at the bonding temperature to produce laminate product of porous, reinforced composites sandwiched between metal strips. The reinforced composite can also be a non-porous impregnated mat also radio frequency sensitized. It can be seen that either one of the supply rolls (113), (115) could be eliminated thereby producing a laminate of reinforced composite having a metal strip bonded on only one side. It can also been seen that an infinite variety of laminates can be produced by the addition of more layers of reinforced composite or metal and with the variety of interspersal of composite and metal sheet. The laminate product (125) is suitable for further treatment as shown subsequent to rollers (29), (31) in FIG. 1.

Referring now to FIG. 5 a process is set forth in which a laminated product such as produced by FIG. 4 in which metal sheet is bonded to one side of the reinforced composite is then used in forming a further laminated structure. Feed rolls (151), (153) forward a reinforced composite (155) through a heater (157), again illustrated as a radio frequency energy heater, in which the temperature of the composite is raised to bonding temperature. The reinforced composite (155) now heated is passed between compression rollers (161), (163) along with reinforced composite/metal sheet laminates (165), (167) which have been forwarded from feed rolls (169), (171) through heaters (173), (175) in which the temperature of the polymer in the laminate has been raised to bonding temperature. In this illustration laminates (165), (167) pass between the compression rollers with the reinforced composite side of the laminate on the inner side away from the compression rollers so that the laminate formed is a sandwich of reinforced composite between metal sheets with the bonding accomplished between layers of reinforced composite. The laminated product (177) is suitable for further treatment as shown subsequent to forwarding rollers (29), (31) of FIG. 1.

The materials used to produce the reinforced composites and the laminates in the processes that have been described above are readily obtained in commerce as will be shown in the examples that follow.

The examples below should be taken as illustrative and not as being exclusive. The processes are a combination of known equipment and materials which could be combined into an operating system. The systems have not been tested.

EXAMPLE I

A roll of 100 mil continuous strand Owens Cornings 8608 fiberglass mat is fed to a liquid slurry tank. The slurry contains 100 parts polyphenylene sulfide powder, cured or uncured, produced by the method of U.S. Pat. No. 3,354,129; 5 parts radio frequency sensitizing agent Frequon ® prepared by the method disclosed in U.S. Pat. No. 4,360,307; 125 parts water and 20 parts propylene glycol. The slurry is ball milled in a Henchel type mill for approximately 16 hours. The fiberglass mat is passed through the slurry mixture held in a retaining tank, over tension rollers and past a doctor blade for removing excess slurry. The impregnated mat is then passed through a radio frequency oven, Diatron 9700L available from Ultramic Industries. The heated composite is passed through nip rollers to regulate the desired resultant laminate thickness. The composite porous or non-porous laminate is then passed through a cutter, a metal shear from DiAcro of Lake City, Minn., in which it is cut into lengths and stacked. These stacks of composites are then passed through a radio frequency heater as described above. A forced draft oven such as by Blue M Electric of Blue Island, Ill. could be used but would not take advantage of the radio frequency sensitivity of the composite. The heated stacks are then pressed and formed into the desired article of manufacture by a 300 ton hydraulic press, made by C. A. Lawton Company of Pere, Wis. After sufficient cooling the formed objects are removed from the press.

EXAMPLE II

The fiberglass of Example I is fed from a roll past an electrostatic spray gun, Model 720 by Gema of Sweden, with a PPS powder and sensitizing agent mixture electrostatically charged at the nozzle exit applied to the mat. The mat then is passed through subsequent equipment as disclosed in Example I.

EXAMPLE III

In a third embodiment the slurry mixture is applied to a fiberglass mat as in Example I using any standard industrial type spray gun. The gun is operated at between 15 psi (0.1 MPa) and 55 psi (0.38 MPa) and adjusted to feed a fine spray. The mat is then passed through subsequent equipment as disclosed in Example I.

EXAMPLE IV

The porous or non-porous laminate exiting the nip roller and prior to cutting in Example I is directed to an additional laminating process. After heating using a radio frequency oven, the laminate is passed into contact with heated sheets of 10 mil aluminum foil from Reynolds aluminum between nip rolls to produce a rigid, metal coated laminate having potential aerospace application.

EXAMPLE V

The porous or non-porous laminate of Example IV can also be directed to an additional laminating process. After heating the laminate using a radio frequency oven the laminate is passed in contact with heated sheets of the rigid metal coated laminate from Example IV to produce a thicker reinforced laminate to provide structural additional support in applications.

We claim:

1. A porous composite of fibrous reinforcing mat surrounded by a discontinuous matrix forming a fused coating of the fibrous mat said matrix comprising poly(arylene sulfide) and a radio frequency energy sensitizer.

2. A non-porous composite of fibrous reinforcing mat surrounded by a continuous matrix forming a fused coating of the fibrous mat said matrix comprising poly(arylene sulfide) and a radio frequency energy sensitizer.

3. A porous composite of fibrous reinforcing mat surrounded by a continuous matrix forming a fused coating of the fibrous mat said matrix comprising poly(arylene sulfide) and a radio frequency energy sensitizer.

4. A method for preparing a porous composite of fibrous reinforcing mat surrounded by a discontinuous matrix forming a fused coating of the fibrous mat said matrix comprising poly(arylene sulfide) and radio frequency energy sensitizer said method comprising:
  (a) impregnating a mat of fibrous reinforcing material with an admixture comprising poly(arylene sulfide) powder admixed with an amount of a radio frequency energy sensitizing composition sufficient to produce an admixture sensitive to melting using radio frequency energy, said admixture present in an amount that on treatment with radio frequency energy produces a discontinuous matrix,
  (b) subjecting said mat impregnated with said admixture to sufficient radio frequency energy to melt said admixture thereby forming a discontinuous matrix of sensitized poly(arylene sulfide) surrounding said reinforcing material with a fused coating, and
  (c) cooling said matrix coated with poly(arylene sulfide) to produce a reinforced composite.

5. A method of claim 4 wherein said impregnating is an electrostatic coating process.

6. A method of claim 5 wherein said impregnated mat of (b) is compacted before cooling.

7. A composite of fibrous reinforcing mat surrounded by a discontinuous matrix forming a fused coating of the fibrous mat said matrix comprising poly(arylene sulfide) and a radio frequency energy sensitizer prepared by the method of claim 5.

8. A method of claim 4 wherein said impregnation is spraying a slurry of said admixture in a liquid carrier onto said mat and the temperature induced to melt said poly(arylene sulfide) is sufficient to remove volatile components of said carrier.

9. A method of claim 8 wherein said impregnated mat of (b) is compacted before cooling.

10. A composite of fibrous reinforcing mat surrounded by a discontinuous matrix forming a fused coating of the fibrous mat said matrix comprising poly(arylene sulfide) and a radio frequency energy sensitizer prepared by the method of claim 8.

11. A method of claim 4 wherein said impregnation is dipping said mat into a slurry of said admixture in a liquid carrier and the temperature induced to melt said poly(arylene sulfide) is sufficient to remove volatile components of said carrier.

12. A method of claim 11 wherein said impregnated mat of (b) is compacted before cooling.

13. A composite of fibrous reinforcing mat surrounded by a discontinuous matrix forming a fused coating of the fibrous mat said matrix comprising poly(arylene sulfide) and a radio frequency energy sensitizer prepared by the method of claim 11.

14. A method of claim 4 wherein said impregnated mat of (b) is compacted before cooling.

15. A method of claim 4 wherein said reinforcing mat comprises continuous filamentous material.

16. A method of claim 4 wherein said reinforcing mat comprises fibrous material that has been chopped or cut.

17. A method of claim 16 wherein the length of said fibers is in a range of about 0.64 cm (0.25 in) to about 25.4 cm (10 in).

18. A composite of fibrous reinforcing mat surrounded by a discontinuous matrix forming a fused coating of the fibrous mat said matrix comprising poly- (arylene sulfide) and radio frequency energy sensitizer prepared by the method of claim 4.

19. A method of claim 4 further comprising contacting at least one surface of said composite of step (c) with a sheet of metal under conditions of temperature and pressure to bond said sheet of metal to said surface of said composite.

20. A laminate prepared by the method of claim 19.

21. A method of claim 4 further comprising contacting at least one surface of said composite of step (c) with a surface of a stratum of poly(arylene sulfide) that has been bonded to a surface of a sheet of metal under conditions of temperature and pressure to bond said stratum of poly(arylene sulfide) to said surface of said composite.

22. A laminate prepared by the method of claim 21.

23. A method for preparing a composite of fibrous reinforcing mat surrounded by a continuous matrix forming a fused coating of the fibrous mat said matrix comprising poly(arylene sulfide) and radio frequency energy sensitizer said method comprising:

(a) impregnating a mat of fibrous reinforcing material with an admixture comprising poly(arylene sulfide) powder admixed with an amount of a radio frequency energy sensitizing composition sufficient to produce an admixture sensitive to melting using radio frequency energy, said admixture present in an amount that on treatment with radio frequency energy produces a continuous matrix, (b) subjecting said mat impregnated with said admixture to sufficient radio frequency energy to melt said admixture thereby forming a continuous matrix of sensitized poly(arylene sulfide) surrounding said reinforcing material with a fused coating, and (c) cooling said material coated with poly(arylene sulfide) to produce a reinforced composite.

24. A method of claim 23 wherein said impregnating is an electrostatic coating process.

25. A method of claim 24 wherein said impregnated mat of (b) is compacted before cooling.

26. A composite of fibrous reinforcing mat surrounded by a continuous matrix forming a fused coating of the fibrous mat said matrix comprising poly(arylene sulfide) and a radio frequency energy sensitizer prepared by the method of claim 24.

27. A method of claim 23 wherein said impregnation is spraying a slurry of said admixture in a liquid carrier onto said mat and the temperature induced to melt said poly(arylene sulfide) is sufficient to remove volatile components of said carrier.

28. A method of claim 27 wherein said impregnated mat of (b) is compacted before cooling.

29. A composite of fibrous reinforcing mat surrounded by a continuous matrix forming a fused coating of the fibrous mat said matrix comprising poly(arylene sulfide) and a radio frequency energy sensitizer prepared by the method of claim 27.

30. A method of claim 23 wherein said impregnation is dipping said mat into a slurry of said admixture in a liquid carrier and the temperature induced to melt said poly(arylene sulfide) is sufficient to remove volatile components of said carrier.

31. A method of claim 30 wherein said impregnated mat of (b) is compacted before cooling.

32. A composite of fibrous reinforcing mat surrounded by a continuous matrix forming a fused coating of the fibrous mat said matrix comprising poly(arylene sulfide) and a radio frequency energy sensitizer prepared by the method of claim 30.

33. A method of claim 23 wherein said impregnated mat of (b) is compacted before cooling.

34. A method of claim 23 wherein said reinforcing mat comprises continuous filamentous material.

35. A method of claim 23 wherein said reinforcing mat comprises fibrous material that has been chopped or cut.

36. A method of claim 35 wherein the length of said fibers is in a range of about 0.64 cm (0.25 in) to about 25.4 cm (10 in).

37. A composite of fibrous reinforcing mat surrounded by a continuous matrix forming a fused coating of the fibrous mat said matrix comprising poly(arylene sulfide) and radio frequency energy sensitizer prepared by the method of claim 23.

38. A method of claim 5 further comprising contacting at least one surface of said composite of step (c) with a sheet of metal under conditions of temperature and pressure to bond said sheet of metal to said surface of said composite.

39. A laminate prepared by the method of claim 38.

40. A method of claim 23 further comprising contacting at least one surface of said composite of step (c) with a surface of a stratum of poly(arylene sulfide) that has been bonded to a surface of a sheet of metal under conditions of temperature and pressure to bond said stratum of poly(arylene sulfide) to said surface of said composite.

41. A laminate prepared by the method of claim 40.

* * * * *